United States Patent

[11] 3,556,264

| [72] | Inventors | Arie Adrianus De Knoing;<br>Kornelis Korstiaan Karel De Koning, Oud-Beijerland, Netherlands |
|---|---|---|
| [21] | Appl. No. | 759,094 |
| [22] | Filed | Sept. 11, 1968 |
| [45] | Patented | Jan. 19, 1971 |
| [32] | Priority | Sept. 22, 1967 |
| [33] | | Netherlands |
| [31] | | No. 67/12,962 |

[54] FOOT VALVE ASSEMBLY FOR SHOCK ABSORBERS
4 Claims, 5 Drawing Figs.

| [52] | U.S. Cl. | 188/100 |
|---|---|---|
| [51] | Int. Cl. | F16f 9/34 |
| [50] | Field of Search | 188/700, 100AF |

[56] References Cited
UNITED STATES PATENTS

| 1,855,064 | 4/1932 | Messier | (188/100AF)UX |
| 2,780,321 | 2/1957 | Sturari | 188/100X |

FOREIGN PATENTS

| 1,036,729 | 4/1953 | France | 188/100(AF) |
| 718,310 | 11/1954 | Great Britain | 188/100 |
| 96,199 | 12/1960 | Netherlands | 188/100 |

*Primary Examiner*—George E. A. Halvosa
*Attorney*—Diller, Brown, Ramik & Holt

ABSTRACT: A hydraulic telescopic shock absorber including a cylinder and a piston with a piston rod mounted for movement therein including the provision of means which allows a shock absorber which is intended to be built in vertically to be used horizontally and even at a negative angle relative to the horizontal.

PATENTED JAN 19 1971

INVENTORS
Arie Adrianus de Koning
Kornelis Korstiaan Karel de Koning
BY
Mason, Porter, Diller & Brown
ATTORNEYS

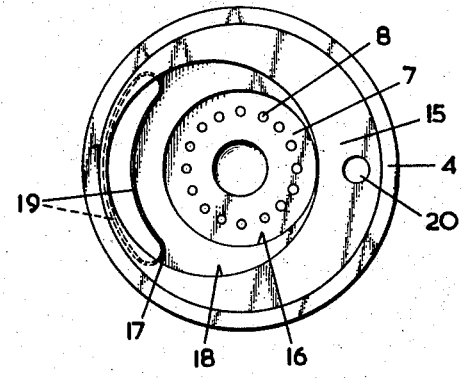
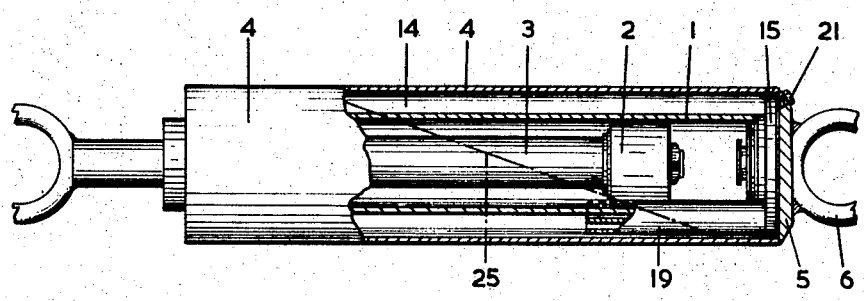

FOOT VALVE ASSEMBLY FOR SHOCK ABSORBERS

The present invention relates to improvements in or relating to a hydraulic telescopic shock absorber including a piston with piston rod mounted for movement therein, there being disposed at the bottom end of the cylinder a valve casing with a valve, opening in the direction of the cylinder, and an intake opening which communicates with an annular reservoir located about the cylinder and partially filled with absorbing liquid, and arranged to replenish the cylinder with absorbing liquid from said reservoir during the outward stroke of the shock absorber.

In an absorber which is not especially adapted for horizontal arrangement the intake opening of the valve casing opens up into the reservoir virtually throughout the annular sectional area thereof.

A shock absorber of this type is suited to be built in vertically, or at a reduced angle relative to the vertical.

With the absorber positioned too obliquely, and partly because of the mass inertia of the absorbing liquid, it may be that the gas, which is usually air and is likewise present in the reservoir, finds its way into the intake opening of the valve casing when the absorber moves rapidly, and subsequently into the cylinder during the outward stroke the absorber, which will adversely affect the damping action.

It is an object of this invention to provide simple means for ensuring that the intake opening of the valve casing continues to be below the liquid level in the reservoir in case the absorber should be mounted in an oblique position.

The construction of the absorber, according to this invention, is such that there is accommodated between the valve casing and the bottom of the cylinder, and in sealed-on relation thereto, a member having an annular opening connecting the intake opening of the casing with the reservoir into which a crescent-shaped passage opens along a limited peripheral portion f of another annular opening.

To enable an absorber of this type to be mounted even in a horizontal position, the mouth of the passage in the reservoir may, according to this invention, include a tubular nozzle facing away from the bottom of the cylinder and extending into the reservoir.

To prevent displacement as the said member is mounted, said member is provided, according to this invention, with a recess facing the bottom of the cylinder, outside the periphery of the crescent-shaped passage, and the bottom of the cylinder is provided with a raised portion fitting said recess so that the member, when it is mounted, continues to take a predetermined position relative to the cylinder bottom.

Moreover, it may be useful, after the absorber has been mounted, to have an indication on which side the mouth in the reservoir is provided. To achieve this, according to the invention, the raised portion in the cylinder bottom is formed by a cam inserted from without and extending into the bottom of the cylinder.

Some embodiments of this invention will now be described, by way of example, with reference to the accompanying drawings in which:

FIG. 4 is a cross-sectional view of the shock absorber on the line IV–IV of FIG. 3; and FIG. 5 shows a shock absorber, according to this invention, in horizontal position.

Figure 1:
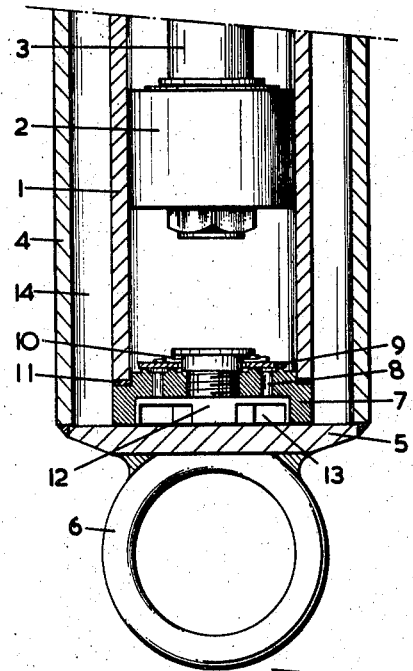
FIG. 1 is a longitudinal sectional view of a part of a shock absorber to be mounted in a vertical or substantially vertical position and including a bottom valve casing of conventional design.

In FIG. 1, numeral 1 denotes a portion of the cylinder of the shock absorber with a piston 2 mounted therein and connected to a piston rod 3. The cylinder 1 is surrounded by a reservoir tube 4 closed underneath by a bottom 5 with an attachment eye 6 secured thereto.

Arranged in between said cylinder 1 and said bottom 5 is a valve casing 7 provided with bores 8 covered by a valve 9 opening in the direction f of the cylinder.

The valve 9 is urged on its seat by a spring 10.

A gasket 11 provides a seal between the cylinder 1 and the casing 7.

The bores 8 at their bottom ends open up into an intake opening 12 which communicates with the reservoir space 14 through a plurality of recesses 13 in the valve casing 7.

Figure 2:
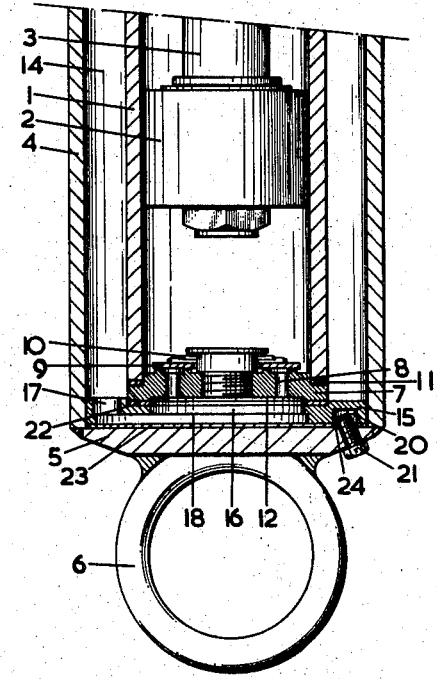
FIG. 2 and 3 are views corresponding to FIG. 1 of the same shock absorber now provided with means according to this invention.

As shown in FIG. 2, h the recesses 13 in FIG. 1 are replaced with a member 15 according to the invention.

The member 15 has a central opening 16 provided therein, which communicates with the intake opening 12. Besides a passage 17 is provided adjacent and along a peripheral portion of said member 15, opposite to the annular opening of the reservoir 14. The opening 16 and the passage 17 are in communication with each other through an opening 18.

Figure 3:
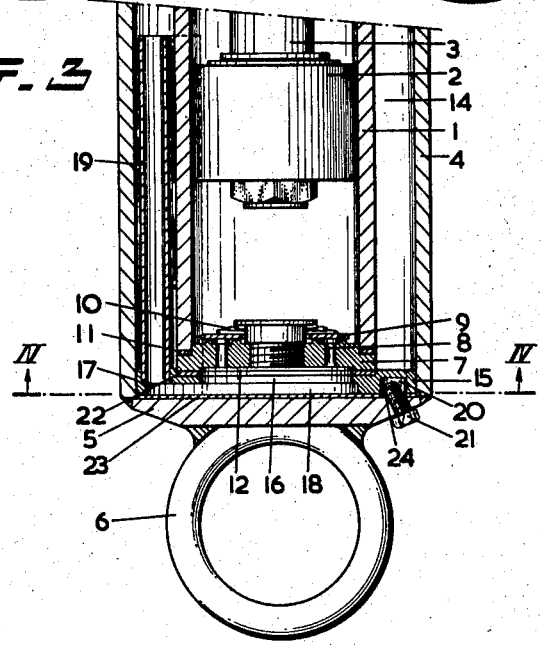

As shown in FIG. 3, there is mounted in the passage 17 a tubular nozzle 19 of crescent section and of the same configuration as the passage 17, said nozzle extending into the reservoir 14.

The member 15 is further provided with a recess 20 facing the bottom 5 and receiving a bolt 21 tsssssssss extending into said recess from without through the bottom 5.

The bolt 21 has the function of a cam for the member 15 to be mounted in a specific position, while the mounting of the bolt 21 from without further provides an indication for the shock absorber to be erected in the proper angular position relative to its axis.

Between the member 15 and the casing 7 is disposed a gasket 22 and between the member 15 and the bottom 5 a gasket 23, the latter being provided with a hole 24 for the bolt 21 to be passed therethrough.

The bolt 21 has no necessity of a separate seal.

As is shown in FIG. 5, the member 15 with the tubular nozzle 19 is mounted in a horizontally positioned shock absorber.

With rapid movements of the absorber the liquid level in the reservoir 14 can take a position as shown by the chain-dotted line 15 as a result of the mass inertial inertia of the absorbing liquid, without the risk of air being drawn into the cylinder.

An existing shock absorber shown in FIG. 1 can be readily reconstructed into a shock absorber shown in FIG. 2 by removing the recesses 13 from the valve casing 7 and mounting the member 15 instead. The building height of the shock absorber will not change.

We claim:

1. A hydraulic telescopic shock absorber including a cylinder and a piston with a piston rod mounted for movement therein, there being disposed at the bottom end of the cylinder a valve casing with a valve, opening in the direction of said cylinder, and an intake opening which communicates with an annular reservoir located about the cylinder and partially filled with absorbing liquid, and arranged to replenish the cylinder with absorbing liquid from said reservoir during the outward stroke of the shock absorber, characterized in that there is accommodated between the valve casing and the bottom of the cylinder, and in sealed-on relation thereto, a member having an annular opening connecting the intake opening of the casing with the reservoir into which a crescent-shaped passage opens along a limited peripheral portion of another annular opening, said member being provided with a recess facing the bottom of the cylinder, outside the periphery of the crescent -shaped passage, and the bottom of the cylinder being provided with a raised portion fitting said recess so that the member, when it is mounted, continues to take a predetermined position relative to the cylinder bottom, said raised portion in the bottom of the cylinder being formed by a cam, such as a bolt, inserted from without and extending into the bottom of the cylinder.

2. A hydraulic telescopic shock absorber including a cylinder and a piston with a piston rod mounted for reciprocating movement therein, a valve casing at the bottom end of the cylinder and a valve opening in the direction of said cylinder and connecting said cylinder with an annular reservoir located around said cylinder and being partially filled with absorbing liquid for compensation of liquid in said cylinder during the outward stroke of the shock absorber, said connection being formed by a passage in a member accommodated between the valve casing and the bottom of the cylinder and in sealed-on relation thereto, said passage debouching into said reservoir along a limited peripheral portion of the annular cross section of said reservoir, said member being provided with a recess opposite said debouching portion and facing the bottom of the cylinder, said bottom being provided with a raised portion fitting said recess, said raised portion being formed by a cam, such as a bolt, inserted from outside and extending into the bottom of the cylinder.

3. A hydraulic telescopic shock absorber including a cylinder and a piston with a piston rod mounted for reciprocating movement therein, a valve casing at the bottom end of the cylinder and a valve opening in the direction of said cylinder and connecting said cylinder with an annular reservoir located around said cylinder and being partially filled with absorbing liquid for compensation of liquid in said cylinder during the outward stroke of the shock absorber, said connection being formed by a passage in a member accommodated between the valve casing and the bottom of the cylinder and in sealed-on relation thereto, said passage debouching into said reservoir along a limited peripheral portion of the annular cross section of said reservoir, a tubular nozzle interfitting with said passage and extending into said reservoir, said tubular nozzle being crescent-shaped in section and being disposed on one side of said piston between said piston and said cylinder.

4. A hydraulic telescopic shock absorber according to claim 3 wherein said member is provided with a recess opposite said debouching portion and facing the bottom of the cylinder and said bottom is provided with a raised portion fitting said recess.